(12) United States Patent
Sawatzki et al.

(10) Patent No.: US 6,208,722 B1
(45) Date of Patent: Mar. 27, 2001

(54) METHOD OF ACCEPTING CHARGES IN INDIVIDUAL CONNECTIONS AND A TELEPHONE NETWORK AND TERMINAL

(75) Inventors: Roland Sawatzki, Neu-Ulm; Rolf Stiefel, Gerlingen, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/185,223

(22) Filed: Nov. 3, 1998

(30) Foreign Application Priority Data

Nov. 5, 1997 (DE) ................................. 197 48 757

(51) Int. Cl.⁷ .................................................. H04M 17/00
(52) U.S. Cl. ........................... 379/144; 379/112; 379/114
(58) Field of Search .................. 379/188–199, 379/201, 207, 210–211, 212, 111–114, 144, 120, 127, 133–134; 455/406–411

(56) References Cited

U.S. PATENT DOCUMENTS

| 4,054,756 | 10/1977 | Comella et al. |
| 5,602,907 | 2/1997 | Hata et al. |
| 5,635,695 * | 6/1997 | Feiken .................................. 235/380 |
| 5,878,124 * | 3/1999 | Griesmer et al. ..................... 379/201 |
| 6,023,503 * | 2/2000 | Schneider et al. .................... 379/188 |

FOREIGN PATENT DOCUMENTS

| 3133530 | 12/1982 | (DE) . |
| 3142492 | 3/1983 | (DE) . |
| 4222235 | 1/1994 | (DE) . |
| 19532660 | 3/1997 | (DE) . |
| 0781027 * | 6/1997 | (EP) . |
| 63-050247 | 3/1988 | (JP) . |
| 02048854 | 2/1990 | (JP) . |

* cited by examiner

Primary Examiner—Duc Nguyen
(74) Attorney, Agent, or Firm—Ware, Fressola, Van Der Sluys & Adolphson LLP

(57) ABSTRACT

A method of accepting the charges for individual connections in a telephone network is proposed, where the called subscriber station signals the cost acceptance, in that an identification number stored on a chip card is read by a card reader 3 of the subscriber terminal 2, and/or is transmitted to the central unit 1 together with a cost acceptance signal. To carry out the method, the telephone network contains means for processing the transmitted binding cost acceptance signals and switch-off signals. The terminals must be able to transmit the corresponding signals.

14 Claims, 1 Drawing Sheet

METHOD OF ACCEPTING CHARGES IN INDIVIDUAL CONNECTIONS AND A TELEPHONE NETWORK AND TERMINAL

TECHNICAL FIELD

The invention begins with a method of accepting charges in individual connections of a telephone network, and with a telephone network and with terminals for use in a telephone network according to the type of the independent claims.

BACKGROUND OF THE INVENTION

It is known from the state of the art that a user can indicate his acceptance of the charges of a telephone call if an operator switches the call. In that case the acceptance of the charges of a telephone call to be established can be verbally agreed with the telephone network operator.

The acceptance of the charges by the called party in an ISDN telephone network is also known. The January 1994 DE-NA-10017 ETSI publication "Integrated Services Digital Network" explains the method when the ISDN telephone network is used. In that case the user can preselect permanent connections for which the cost acceptance has been agreed with the network operator. But it also possible to signal a cost acceptance when such a service has been requested by the caller. The user must then present his user identification to the network operator through a password which is entered into the telephone set in the form of a combination of numbers. This cost acceptance service must be designed for the individual user. In the fixed ISDN network the cost acceptance function is restricted to a predetermined subscriber line.

A telephone installation is known from DE-OS 42 22 235, where the terminals are operated by a chip card. The chip card contains a personal account number for the applicable fee, which is coordinated by comparing it to a data base in the telephone installation. The individual terminals can only be operated if the personal account number authorizes the respective user to establish a connection. To carry out the method, the telephone terminals contain a card reading unit which is able to read the information stored on a chip card.

Also known is the use of so-called SIM (Subscriber Identity Module) cards for use in GSM radio telephone networks. These cards contain a personal identification number, an algorithm and a personal subscriber code for producing an authentication information which is transmitted to a central station where it is checked for the user's authorization. The use of the known chip cards makes it possible to establish connections but not to accept the charges, which are only created by a call from a third party.

SUMMARY OF THE INVENTION

In contrast, the method of the invention with the characterizing features of the independent claim has the advantage that the binding cost acceptance can be signalled from any subscriber terminal, by reading an identification number stored on the chip card, which is transmitted to a central unit together with the willingness of accepting the charge.

The measures indicated in the subclaims make it possible to further develop and improve the method presented in the independent claim.

It is a special advantage that the identification signal of the chip card and not the identification of the subscriber's station is verified. This makes it possible to use the personalized chip card in different subscriber stations. The user can simply insert his personal chip card and in this way accept the charges for an incoming call. Verifying the identification number and recording the cost of the connection in an account that is assigned to the identification number takes place centrally. The numbers are centrally managed as well.

This simple method allows signalling the acceptance of the cost of an existing connection at any point and at any time during the connection. The distribution of the cost can then take place both before the cost acceptance is signalled and after the cost acceptance is signalled, or the full cost of a connection can be accepted as well.

To carry out the method, the telephone network of the invention requires suitable communication protocols and suitable evaluation possibilities for the binding cost acceptance signal, switch-off signal and authentication information being transmitted to the central station. Such a cost acceptance can take place both in a permanent as well as a radio telephone network.

The terminal that is used for the service according to the invention has a card reader for chip cards, so that a binding signal of the cost acceptance and switch-off of the cost acceptance can take place. As an alternative, the cost acceptance message can be produced by an acoustically coupled device in the terminal, into which a chip card can be inserted or which contains a corresponding built-in functionality.

BRIEF DESCRIPTION OF THE DRAWINGS

The drawing illustrates an embodiment of the invention which is explained in greater detail in the following.

BEST MODE FOR CARRYING OUT THE INVENTION

Figure 1:
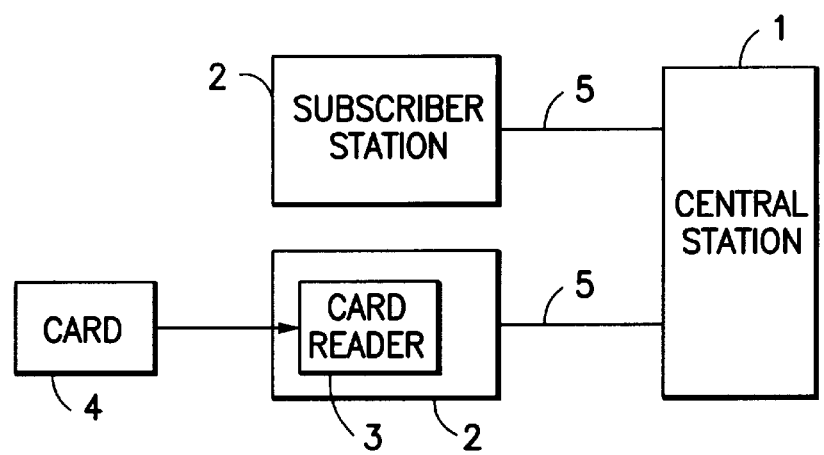
FIG. 1 depicts a schematic telephone network.

In FIG. 1 a central station 1 is connected to subscriber terminals 2 via connections 5. A subscriber terminal 2 contains a card reading device 3 into which a chip card 4 can be inserted.

To accept the cost of a connection between subscribers, the called subscriber can signal his willingness to accept the charge for the existing connection after inserting the chip card 4 into the card reading device 3 and a possible verification of the PIN code. After the service has been requested, the identification number, the cost acceptance message and the authentication information are then read by the card reading device in the subscriber's terminal, or by the added acoustical equipment, and are transmitted to the central station 1. The identification number is issued as a personal number to a user and is not assigned to the subscriber's station. The central station verifies the authenticity of the subscriber and of the acceptance or the switch-off signal, and the assignment to the user's account is carried out by means of the identification number. After a positive verification the central station signals the cost acceptance or its switch-off to the origination exchange of the call, and the caller receives a message that the cost acceptance is in effect or that it has been switched off. The subscriber receives corresponding information. The caller bears the cost of the call if the cost acceptance verification is not positive.

Accepting the cost when using the chip card allows the subscriber to accept the cost of telephone calls and of telecommunication services from a terminal which is equipped with a card reader. In this case it is possible to accept the cost while the connection is being established, during the call or at the end of the call. As a further option the subscriber can provide a list of addresses for which the cost acceptance is in effect. The list of addresses can be stored on the chip card or optionally in the network. After the cost has been accepted, the subscriber has the possibility during the entire connection time to switch the cost acceptance off by means of a switch-off signal, so that the caller now bears the cost for the subsequent period of time.

The subscriber signs up for the service from a network operator or service provider and receives a chip card containing a personal identification number, codes and algorithms for producing the authentication information, the cost acceptance and switch-off message, and sign-up options for the subscriber. When signing up, the subscriber can select options for the partial or total cost acceptance of the call, or for cost acceptance up to a limited amount.

In accordance with known methods, such as with chip cards for mobile radio, GSM, the subscriber has the option of protecting the chip card against unauthorized use by third parties, perhaps due to loss, with the help of a PIN (personal Identification Number). To that end the subscriber receives a PIN memo with his chip card. After the chip card has been inserted into the card reader, it can be unblocked for service use by entering a PIN.

The service request for all signed up options can take place through the subscriber or the terminal, the chip card, the caller or the operator. To that end specific parameters are stored on the chip card and are transmitted to the central station.

Acceptance of the cost takes place through a cost acceptance message which the subscriber can initiate at the terminal and which is transmitted from the chip card to a central unit. When a list of addresses is used, the cost acceptance signal is automatically released by the chip card with support from the terminal or the central station. To use the service the personal identification number, the cost acceptance message and the authentication information are read by the chip card and are transmitted to the central station. To that end the cost acceptance message contains information about the signed up options.

The subscriber is able to stop the cost acceptance at any moment by means of a switch-off signal transmitted by the chip card to the central station. The authentication information may be based on different known methods, such as the PIN, message authentication or a digital signature. A variation of the method enables the cost acceptance for every incoming call after the chip card has been inserted into the card reader, and the willingness to accept the cost remains in effect until a switch-off signal is released.

Figure 2:
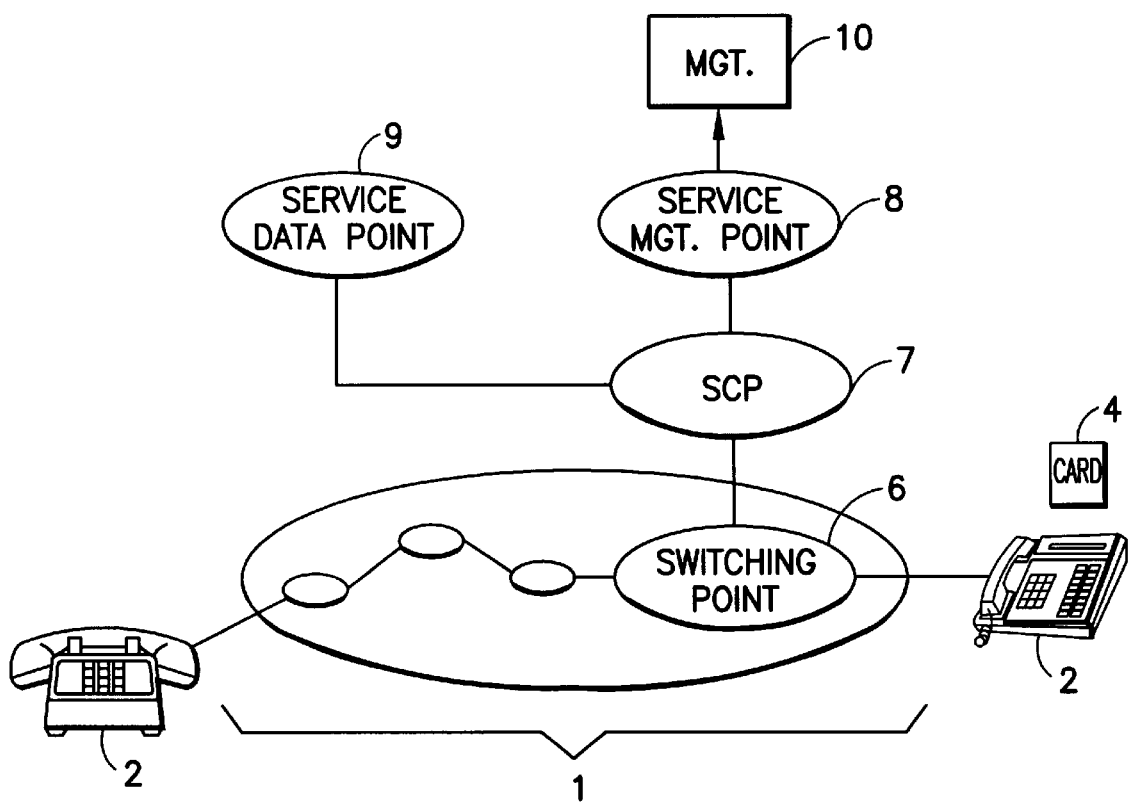
FIG. 2 depicts a telephone network with an intelligent network architecture.

FIG. 2 illustrates the construction of the central station as an intelligent network in which the cost acceptance function can be implemented in a simple manner. The subscriber terminals 2 in the central station 1 are first connected to the switching point 6. This service-independent signalling node is connected to the SCP (Service Control Point) of the central service control 7. The service management point 8 and the service data point 9 in turn are connected to the central service control. The central service control must be specially designed for the cost acceptance method. The SCP controls and monitors the service process and verifies the transmitted cost acceptance and switch-off messages and the authentication information. In that case it may be supported by the service data point 9. Upon positive verification the costs are computed in the service management point 8, which includes the management of the fees and the subscriber terminal. The service management point 8 is connected to a management 10, which monitors the management of the cards, the identification numbers, their issuance and their assignment to a user.

The realization of the cost acceptance method for individual connections of a telephone network is also possible without any problem in other system architectures. In that case the connections need not to be permanent connections as in the present example, but they can also be radio networks. Since in radio networks the identification and authentication of the subscribers can take place through a chip card, and the central management is already equipped for verifying the identification numbers, the cost acceptance function can be particularly simple. In that case it is only necessary to transmit a cost acceptance signal to the central station during the establishment of a radio connection for the called subscriber, who has already been identified through his chip card.

What is claimed is:

1. A method of accepting charges in individual connections of a telephone network in which subscriber terminals (2) are connected to a central unit (1), characterized in that a called subscriber signals acceptance of a cost by producing a cost acceptance message with the help of a chip card (4) through a chip card reader in a subscriber terminal (2), and the message is transmitted to the central unit (1).

2. A method as claimed in claim 1, characterized in that the cost acceptance message is a message that is encoded for security purposes.

3. A method as claimed in claim 1, characterized in that the chip card (4) contains an identification number, at least one secret subscriber code and encoding algorithms for producing authentication information and the cost acceptance message.

4. A method as claimed in claim 1, characterized in that the central unit (1) verifies the cost acceptance message and records the accepted connection cost in an account assigned to an identification number.

5. A method as claimed in claim 4, characterized in that the identification number and secret subscriber codes are supplied by a central management of a network operator wherein the secret subscriber codes are used for producing authentication information and the cost acceptance message.

6. A method as claimed in claim 1, characterized in that the cost acceptance of an existing connection can be signalled and/or interrupted at any time during the connection.

7. A method as claimed in claim 1, characterized in that the cost acceptance can be signalled when the connection is being established.

8. A method as claimed in claim 3, characterized in that the identification number is simultaneously evaluated as a cost acceptance signal.

9. A method as claimed in claim 1, characterized in that the cost acceptance function can be interrupted at any time during the connection or when an agreed cost limit has been reached.

10. A telephone network comprising terminals (2) and at least one central unit (1), where the central unit (1) is established in an intelligent network architecture and contains means for detecting subscribers, identification numbers of individual card users and accounts (8, 10), as well as means for verifying received identification numbers (9) which are read by means of a chip card (4) and a card reader (3), and means for recording costs in an account (8, 10) assigned to an identification number wherein the chip card (4) and the card reader (3) are used to transmit a cost acceptance signal, characterized in that means for processing the transmitted cost acceptance signal are provided, wherein the cost acceptance signal indicates acceptance of a cost to a called subscriber for an individual connection of the telephone network.

11. A telephone network as claimed in claim 10, characterized in that the connections between the central unit (1) and terminals can be permanent connections or radio links.

12. A terminal (2) for use in a telephone network comprising terminals (2) and at least one central unit (1), where the central unit (1) is established in an intelligent network architecture and contains means for detecting subscribers, identification numbers of individual card users and accounts (8, 10), as well as means for verifying received identification numbers (9) which are read by means of a chip card (4) and a card reader (3), means for recording costs in an account (8, 10) assigned to an identification number, and means for processing a transmitted cost acceptance signal produced by a card reading device (3) for chip cards (4), characterized in that the card reader (3) produces a cost acceptance signal and the terminal transmits the cost acceptance signal to the central station (1) after the user has been identified by means of the chip card (4), or the user triggers the signal, wherein the cost acceptance signal indicates acceptance of a cost to a called subscriber for an individual connection of the telephone network.

13. A terminal (2) for use in a telephone network comprising terminals (2) and at least one central unit (1), where the central unit (1) is established in an intelligent network architecture and contains means for detecting subscribers, identification numbers of individual card users and accounts (8, 10), as well as means for verifying received identification numbers (9) which are read by means of a chip card (4) and a card reader (3), means for recording costs in an account (8, 10) assigned to an identification number, and means for processing a transmitted cost acceptance signal produced by a card reading device (3) for chip cards (4), characterized in that the terminal reads a cost acceptance signal from the chip card which was inserted into the card reader, and transmits it to the central station (1), wherein the cost acceptance signal indicates acceptance of a cost to a called subscriber for an individual connection of the telephone network.

14. A terminal (2) for use in a telephone network comprising terminals (2) and at least one central unit (1), where the central unit (1) is established in an intelligent network architecture and contains means for detecting subscribers, identification numbers of individual card users and accounts (8, 10), as well as means for verifying received identification numbers (9) which are read by means of a chip card (4) and a card reader (3), means for recording costs in an account (8, 10) assigned to an identification number, and means for processing a transmitted cost acceptance signal produced by a card reading device (3) for chip cards (4), characterized in that the cost acceptance message is produced by an acoustically coupled device in the terminal into which a chip card can be inserted, and which possesses a corresponding built-in functionality, wherein the cost acceptance signal indicates acceptance of a cost to a called subscriber for an individual connection of the telephone network.

* * * * *